3,264,061
ALUMINA PRODUCT AND ITS METHOD
OF PREPARATION
William L. Kehl, Indiana Township, Allegheny County,
and Meredith M. Stewart, Penn Hills Township, Allegheny County, Pa., assignors to Gulf Research & Development Company, Pittsburgh, Pa., a corporation of Delaware
No Drawing. Filed Dec. 21, 1962, Ser. No. 246,331
11 Claims. (Cl. 23—141)

This invention relates to alumina compositions and to the method for their preparation.

When aqueous aluminum salt solution is added to aqueous ammonium bicarbonate solution so that the pH of the mixture is in the range 7 to 9 throughout substantially the entire addition, the resulting precipitate is comprised in major proportion of an alumina hydrate having a novel crystalline configuration. The ammonium bicarbonate serves not only as a precipitant but also as the buffer solution and is therefore present in the mixture in relatively massive quantity, sufficient to maintain the pH of the mixture within the range 7 to 9 throughout substantially the entire mixing operation. During substantially the entire mixing operation a pH below 7 and above 9 is avoided. The novel crystalline alumina hydrate prepared by this method is described in application Serial Number 246,460, filed on the same date as this application, by William L. Kehl and Meredith M. Stewart.

Although a variety of substances exist which are capable of serving the function of precipitant and buffer, when employing ammonium bicarbonate as precipitant and buffer an alumina hydrate is produced which is comprised nearly completely of a unique crystal and which has a small amorphous portion. Ammonium bicarbonate is the only precipitant and buffer which produces this unique crystalline alumina hydrate. Although the alumina hydrate precipitated when employing ammonium bicarbonate commonly contains about 2.4 moles of water per mole of alumina its crystalline structure is not similar to that of the known alumina hydrates possessing this amount of water of hydration. While alumina monohydrate is known as boehmite and alumina trihydrates are known as bayerite, gibbsite and nordstrandite, hydrates containing more water of hydration than boehmite but less water of hydration than bayerite, gibbsite and nordstrandite are generally known as pseudoboehmites. However, the alumina hydrate product of the bicarbonate precipitation does not exhibit the X-ray diffraction pattern nor other physical characteristics of the alumina hydrates commonly known as pseudoboehmite.

The crystalline portion of the alumina hydrate product of the bicarbonate precipitation was studied for its X-ray diffraction qualities, the amorphous portion of the sample also being present but acting only as a diluent in the diffraction study and not interfering with the X-ray diffraction pattern produced by the crystalline portion. The crystalline portion of the alumina hydrate product of the bicarbonate precipitation was found to be comprised of adjacent molecules arranged three dimensionally as a lattice to form individual or cellular crystalline units; known as unit cells. Each individual unit cell is comprised of about eight molecules of $$Al_2O_3 \cdot xH_2O \quad (1<x<3)$$

as determined by X-ray diffraction. The basic crystal structure having all the characteristics of a large mass of the crystalline material is formed in a single one of these unit cells and the entire crystalline portion of the material is comprised of a large number of repeating, identical unit cells, each having about eight molecules of $Al_2O_3 \cdot xH_2O$ ($1<x<3$). As determined by X-ray diffraction, each unit cell of the alumina hydrate product of the bicarbonate precipitation is approximately cubic in configuration, being three dimensional and having all three axes at right angles to each other, with each of the three lateral axes being of nearly equal length and measuring about 8.2 A. on edge. While X-ray diffraction tests indicate that the three lateral axes of the alumina hydrate crystal product the bicarbonate precipitation are not exactly equal to each other in length, they are sufficiently nearly equal in length so that the crystal structure more closely approximates a cube than the crystals of other known alumina hydrates since crystals of other known alumina hydrates are definitely tetragonal or orthorhombic in configuration. An approximately cubic crystalline configuration is unique among known alumina hydrate crystals. It is unlike the crystalline configuration of the hydrates produced with precipitants and buffers other than ammonium bicarbonate wherein adjacent molecules tend to be arranged as a lattice forming unit cells which do not in any way approximate a cube but are definitely tetragonal or orthorhombic in configuration, as determined by X-ray diffraction. For example, as reported in the literature, the unit cell of boehmite has axial dimensions of 2.86 A., 12.23 A. and 3.69 A. while the unit cell for bayerite has axial dimensions of 5.02 A., 8.69 A. and 4.77 A. In contrast, each of the axes of the unit cell of the alumina hydrate product of the bicarbonate precipitation measures sufficiently close to 8.2 A. that the crystalline structure is basically cubic.

In dehydration of the alumina hydrate product of the bicarbonate precipitation in which the cubic crystalline alumina hydrate predominates and which can contain from 5 to 20 percent by weight of amorphous alumina hydrate, the temperature of dehydration or calcination has a significant effect upon the structure of the dry alumina product. Calcination to a temperature between 350° F. and 450° F. was unexpectedly observed to substantially completely transform the cubic crystalline phase to an amorphous phase and continued heating to a temperature above this range caused crystal ordering to begin to reappear, as evidenced by X-ray diffraction. Crystal ordering continues to increase as the calcination temperature is increased to 575° F., and this ordering is more apparent after calcination at 750° F. Although structural ordering continues to improve with increasing temperature, at 900° F. the structure is still quite disordered. While most of the water of hydration is lost at 400° F. and essentially all of it is lost at a temperature of 750° F. it is not until after calcination at 1400° F. that an X-ray diffraction pattern appears which is similar to that of the anhydride eta alumina or similar to that of another anhydride, gamma alumina. While the various alumina anhydrides, such as eta alumina and gamma alumina, are evidently structurally distinct from each other because they are derived from distinct alumina hydrate precursors, such as bayerite, nordstrandite, boehmite and the pseudoboehmites, nevertheless these anhydrides themselves are not readily distinguishable one from the other by means of their respective X-ray diffraction patterns. The same situation prevails with respect to the calcination product of the cubic alumina hydrate. Its X-ray diffraction pattern after calcination at 1400° F. is similar to that produced by other activated aluminas, but its molecular structure after calcination is evidently different from the structure of other activated aluminas because it comes from a precursor hydrate, the cubic alumina, which is structurally different from the precursors of other activated aluminas.

We have now discovered that the cubic alumina hydrate product of the bicarbonate precipitation possesses the unusual capacity of being capable of transformation into a particularly advantageous form of pseudoboehmite containing only slightly more than one mole of water per mole of alumina, by heat treatment at a temperature of at least about 350° F. to 450° F. but lower than 1400° F., followed by rehydration. Rehydration occurs by contact with and chemical absorption of liquid water by the heat treated alumina hydrate, accompanied by shrinkage of the alumina granules and an increase in bulk density. Contact of the heat treated hydrate with water preferably continues until there is substantial achievement of rehydration equilibrium. This behavior of a dried alumina is highly unusual. Most dried alumina hydrates are incapable of rehydration and in the rare instances where rehydration occurs the rehydrated alumina product is the trihydrate, containing more water of hydration than its predecessor hydrate. However, the rehydrated alumina of this invention is pseudoboehmite, having more than one and less than three moles of water per mole of alumina as does its predecessor hydrate.

When the cubic alumina hydrate is heated to a temperature of 400° F. its crystalline content is nearly completely transformed to an amorphous form. Following heat treatment the amorphous alumina formed by the heat treatment is substantially dry but is capable of chemical rehydration upon contact with liquid water and upon rehydration is converted into a highly advantageous form of pseudoboehmite.

In accordance with this invention we have further discovered that upon continued heating of the amorphous alumina hydrate formed at 400° F. to a higher temperature, for example, 750° F., a portion of the amorphous alumina recrystallizes to produce a gamma-type alumina, and this recrystallized material does not have the capacity to rehydrate. As the calcination temperature increases, the proportion of the amorphous phase initially formed during the heat treatment which recrystallizes to form a gamma-type alumina also increases, and the amount of pseudoboehmite produced by rehydration decreases accordingly. Extent of rehydration to pseudoboehmite is proportional to the amount of the amorphous phase remaining in the heat treated sample. If the cubic alumina hydrate is heat treated at a temperature as high as 1400° F. it recrystallizes completely to form the gamma-type alumina and no portion of it is capable of rehydration. Therefore, the extent of pseudoboehmite formation upon rehydration is determined by the temperature of heat treatment, and the rehydration can be totally repressed by a heat treatment which is too severe. In general, completely rehydratable amorphous alumina for the production of pseudoboehmite is achieved by heat pretreatment of the cubic alumina hydrate to a temperature of at least 350° F. but no higher than 450° F. Most of the amorphous alumina remains rehydratable after heat treatment of the alumina to temperatures as high as 900° F. The alumina sample preferably remains at its heat treatment temperature until there is substantial achievement of recrystallization equilibrium throughout the sample.

If the cubic alumina hydrate is heat treated to a temperature above about 350° F. or 400° F. but below about 1400° F., upon rehydration a composite comprising pseudoboehmite and gamma-type alumina is obtained. The pseudoboehmite is the product of chemical rehydration and the gamma-type alumina is the portion that was incapable of chemical rehydration. Upon subsequent calcination of the composite to a temperature between about 750° F. and 1500° F. a final product is obtained which is a blend of two different types of gamma alumina; the first type of gamma alumina having been present in the admixture with the pseudoboehmite prior to calcination and the second type of gamma alumina being the anhydrous calcination product of the pseudoboehmite itself.

Although the cubic alumina hydrate product of the bicarbonate precipitation commonly contains about 2.4 moles of water per mole of alumina, for purposes of this invention it is in no way equivalent to other known alumina hydrates containing a similar amount of water of hydration. While alumina monohydrate is known as boehmite and alumina trihydrates are known as bayerite, gibbsite and nordstrandite, hydrates containing more water of hydration than boehmite but less water of hydration than bayerite, gibbsite and nordstrandite are generally known as pseudoboehmites. However, the cubic hydrate is not pseudoboehmite since it does not exhibit the X-ray diffraction pattern nor other physical characteristics of the intermediate hydrate commonly known as pseudoboehmite. Furthermore, while the cubic hydrate is capable of rehydration in accordance with this invention to convert it into a different material having increased mechanical strength and an increased surface area, the alumina hydrates of the prior art known as pseudoboehmite do not generally exhibit any similar capacity for rehydration. Since the combination heat treatment-rehydration process of this invention is operable only upon the particular alumina hydrate formed by reacting a suitable aluminum salt with ammonium bicarbonate in the pH range 7 to 9, the method of preparation required to produce the cubic hydrate which is capable of chemical rehydration is therefore critical to the present invention.

The alumina hydrate whose major constituent is crystalline and possesses a cubic crystalline lattice is prepared by adding an aqueous aluminum salt solution to an aqueous ammonium bicarbonate solution slowly, preferably intermittently, with stirring and with sufficient care to substantially avoid even temporary localized zones in the mixture having a pH outside the range 7 to 9. The aluminum salt solution is substantially free of metals other than aluminum and the ammonium bicarbonate solution is substantially free of metals, especially sodium and potassium. The ammonium bicarbonate is present in sufficient quantity and concentration to act as a buffer. Within this pH range carbon dioxide freely evolves during the precipitation and the reaction proceeds according to the equation $$2AlCl_3 + 6NH_4HCO_3 \rightarrow Al_2O_3 \cdot xH_2O + 6NH_4Cl + 6CO_2$$

It is important that the ammonium bicarbonate be present in sufficient quantity to maintain the pH in the range 7 to 9 throughout the precipitation. At a pH below 7 and at a pH above 9 the cubic alumina hydrate is only obtained with large amounts of other hydrates. For example, a conventional method for the preparation of an alumina hydrate is by adding aqueous ammonium hydroxide solution to aqueous aluminum chloride solution. Before any hydroxide is added to the aluminum chloride solution the pH of this latter solution is about 2.3. The addition of ammonium hydroxide to the aluminum chloride solution causes its pH to increase and within the pH range 3 to 4.5 non-filterable but non-ionic colloidal sol forms having the formula $Al(OH)_xCl_y$, where $x+y=3$. With continued addition of ammonium hydroxide, the dispersed non-ionized sol sets to a gel upon attaining a pH of about 5 to 5.5. Upon the formation of the gel the solution sets to such a high consistency that effective stirring is no longer possible. The product of this method is a varying mixture of alumina hydrates including substantial quantities of bayerite, amorphous alumina and other hydrate forms such as gibbsite and nordstrandite.

The formation of a sol and a gel in the preparation of alumina hydrate can be avoided by mixing the aqueous aluminum chloride solution and the aqueous ammonium hydroxide at pH values solely in the basic range. This can be accomplished by adding small increments of aqueous aluminum chloride solution accompanied by thorough mixing to aqueous ammonium hydroxide. With sufficiently small increments of aluminum chloride solution added sufficiently slowly and with adequate agitation, localized zones of pH below 7 are substantially completely avoided. Reaction in this manner results in a mixed solution having pH values between about 12 and 7 and within this range a crystalline alumina precipitate is formed.

When forming a crystalline precipitate in this manner it is important that the aqueous aluminum salt be added incrementally with sufficient care and slowness so that even temporary, localized zones of pH below 7 are avoided since such acidic localized zones not only reduce the purity of the crystalline precipitate being formed by inducing sol and gel formation but also peptize crystalline precipitate already formed converting it into an amorphous gel form. Once exposed to a pH below 7 crystalline alumina hydrate is irreversibly converted to an amorphous form and cannot subsequently be reconverted to the crystalline form by increasing the pH.

When the initial increments of aqueous solution of aluminum ions are added to aqueous ammonium hydroxide, the pH of the mixed solution starts to drop from a value of about 12. Within the pH range 12 to 9, the alumina hydrate precipitated is the intermediate hydrate form having the approximate formula $Al_2O_3 \cdot 1.2-2.6H_2O$ which, only minutes after formation, starts to hydrate to trihydrate. If the mixing operation occurs at room temperature, or even at temperatures up to 170° F. to 180° F., this transformation of the intermediate hydrate to trihydrate proceeds rapidly. With further addition of aqueous aluminum chloride solution to the aqueous ammonium hydroxide, the pH continues to fall until the pH range 9 to 7 is reached. Within the pH range 9 to 7 the alumina hydrate precipitate formed is also the intermediate hydrate but within this lower pH range the hydration to trihydrate proceeds at a much slower rate. However, the ordinarily slow transformation of intermediate hydrate to trihydrate within the pH range 9 to 7 is catalyzed by any trace quantities of trihydrate which are present, for example, trihydrate previously formed within the pH range 12 to 9.

It is an important advantage in the ammonium bicarbonate preparation of the cubic alumina hydrate that precipitation at a pH above 9 is substantially avoided and therefore formation of trace quantities of bayerite is also avoided. In accordance with the present invention, although the pH of the ammonium bicarbonate solution prior to the addition of aluminum salt solution may be about 10, the pH falls to the range 7 to 9 almost instantaneously upon the addition of the first drop of aluminum salt solution and if there is sufficient ammonium bicarbonate present the pH remains within the range 7 to 9 throughout the operation. In this manner precipitation of trace quantities of bayerite is substantially avoided. The reason that addition of acid aluminum salt to bicarbonate solution having a pH above 9 results in instantaneous reduction of the pH to a value below 9 is that a bicarbonate solution having a pH above 9 necessarily contains very few hydroxyl ions. The reason is that at a pH above 9 bicarbonate ion reacts with hydroxyl ion removing hydroxyl ion from the solution according to the equation:

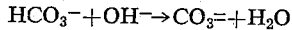

$$HCO_3^- + OH^- \rightarrow CO_3^= + H_2O$$

The ammonium bicarbonate employed must be free of other alkaline precipitants and it is especially important that bicarbonates of alkali metals, such as sodium and potassium bicarbonate, not be utilized as precipitants together with ammonium bicarbonate. These metals interfere with the production of the cubic alumina hydrate precipitate. It appears the presence of metallic impurities such as sodium catalyzes dehydration of alumina hydrates having more than one mole of water per mole of alumina to the monohydrate, boehmite. Furthermore, these metals remain as impurities in the hydrate which is formed, even after prolonged washings, and tend to reduce the catalytic activity of the final product. On the other hand, ammonia, being volatile, is completely vaporized during the drying operation. A further disadvantage in the use of sodium or potassium bicarbonate is that even trace quantities of these metals drastically inhibit the ability of a catalyst containing dehydrated alumina to undergo reactivation by the common means of burning carbonaceous materials from the catalyst surface since these metals have low melting points and act as fluxes, tending to sinter active catalytic sites during high temperature catalyst reactivation.

A variety of aqueous solutions of aluminum salts can be employed including aqueous solutions of aluminum chloride and aluminum nitrate. Aqueous solutions of other soluble acidic aluminum salts such as soluble aluminum salts of carboxylic acids such as aluminum formate or aluminum propionate can be employed. The aluminum salt solution should be free of metals other than aluminum. Aqueous aluminum sulfate solution is not desirable since alumina hydrate formed in the presence of sulfate ion contains significant amounts of basic aluminum sulfates. Furthermore, it is difficult to adequately remove sulfate from the product even by protracted washings. The molality of the aluminum salt solution is not critical and can range between 0.1 and 4.0 molality. Dilute solutions of not more than 1 or 2 molality are preferred.

The cubic crystalline alumina hydrate produced by the bicarbonate precipitation method can contain between 5 and 20 percent by weight of amorphous alumina. The cubic crystalline alumina hydrate is very light and upon calcination yields an alumina anhydride having a well developed pore structure with a large surface area, a large pore volume and a high average pore radius. The high porosity of these aluminas results in a very low bulk density. Measured in the granular form after calcination, the bulk density ranges from 0.25 to 0.45 gram per milliliter. This is only about half as dense as most catalytic aluminas.

Tests were conducted for the purpose of comparing the physical characteristics of a calcined heat treated and rehydrated cubic alumina of this invention with the physical characteristics of a non-rehydrated calcined cubic aluminum hydrate. The details and results of these tests follow.

EXAMPLE 1

2000 milliliters of $NH_4OH$ (28 percent $NH_3$) were mixed with 4000 milliliters of water and this solution was saturated with carbon dioxide gas to produce a solution of ammonium bicarbonate substantially free of carbonate. The pH of the saturated solution was 9.7.

2000 grams of $AlCl_3 \cdot 6H_2O$ were dissolved in 10 liters of water and this solution was added to the ammonium bicarbonate solution in a slow stream with constant stirring until a pH of 8.0 was obtained. Almost instantaneously upon addition of $AlCl_3$ solution the pH in the bicarbonate solution dropped below 9.

The precipitate was filtered and washed with water containing 1 gram of ammonium bicarbonate per liter. The filter cake which comprised mostly cubic alumina hydrate with some amorphous alumina was dried at 250° F. for 16 hours and then calcined at 900° F. for 16 hours. The results of nitrogen adsorption tests are shown in Table 1.

EXAMPLE 2

The cubic alumina of Example 1 after being heated at 900° F. for 16 hours was wetted with liquid water and then dried at 250° F. for 16 hours. This sample was then subjected to X-ray diffraction tests which showed that it contained an appreciable quantity of pseudoboehmite. It was then calcined at 900° F. for 16 hours and subjected to nitrogen adsorption tests. The nitrogen adsorption tests disclosed a pore size distribution characteristic of pseudoboehmite derived alumina. A comparison of the results of nitrogen adsorption tests made on the heat treated and rehydrated alumina of this example and the non-rehydrated alumina of Example 1 is shown in Table 1.

*Table 1*

|  | Example 1 | Example 2 |
|---|---|---|
| Average Pore Radius (A.) | 68 | 25 |
| Pore Volume (ml./gm.) | 0.82 | 0.40 |
| Surface Area (m.²/gm.) | 285 | 350 |
| Bulk Density (gm./ml.) | 0.25 | 0.41 |
| Pore Size Distribution: Percent of the Pore Volume Having the Listed Pore Radius (A.): | | |
| +200 | 11.8 | 6.4 |
| 100–200 | 23.2 | 8.1 |
| 50–100 | 25.8 | 9.6 |
| 40–50 | 10.5 | 6.1 |
| 30–40 | 14.3 | 10.7 |
| 20–30 | 14.3 | 23.7 |
| 10–20 | 0.0 | 35.4 |
| −10 | 0.0 | 0.0 |

Table 1 shows that a considerable number of fine pores (10–30 A. radius) were formed by the heat treatment-rehydration process. The heat treatment-rehydration process increased the bulk density of the alumina and also improved the mechanical strength of the granules.

As previously noted, the characteristics of the rehydrated sample depend upon the temperature of the heat treatment prior to rehydration. A different heat treatment temperature prior to rehydation would produce upon rehydration an alumina having different physical properties.

The heat treated and rehydrated alumina hydrate of this invention has wide utility as a catalyst support. For example, tests were made comparing as a support the heat treated and rehydrated cubic alumina hydrate of this invention with a calcined cubic alumina hydrate which had not been rehydrated and also with a widely used commercial reforming catalyst whose support was comprised substantially entirely of a conventional alumina. Each catalyst was activated with platinum to approximately the same percent of total catalyst weight and tested under conventional reforming conditions. In the respective reforming tests, equi-volume samples of each catalyst were utilized.

Even though the catalyst bed utilized in each of the three tests were volumetrically equal, because of difference in bulk density physical measurement tests showed that the commercial catalyst sample possessed the greatest total weight, the greatest weight of platinum and the greatest surface area, as compared to the non-rehydrated and the rehydrated cubic aluminas. In spite of this, the reforming test results showed that the catalyst of this invention employing the rehydrated alumina produced more aromatics from a naphtha charge at a given debutanized liquid reformate yield than the same volume of the commercial catalyst. The reforming test results further showed that the catalyst of this invention produced a reformate product having a higher motor octane number and a higher research octane number at a given debutanized liquid yield as compared to the reformate product produced by the same volume of commercial catalyst. Since the cost of a catalyst is determined by its weight rather than its volume, these improved results were achieved at a substantial savings in catalyst cost.

Although the reforming reactor bed of platinum on calcined rehydrated cubic alumina catalyst of this invention contained a greater total catalyst weight and a greater weight of platinum than a similar volume of platinum on calcined non-rehydrated cubic alumina catalyst, the reforming test results showed that this difference was more than compensated for by increased aromatics production at a given reformate debutanized liquid yield and by increased motor octane number at a given reformate debutanized liquid yield as compared to the non-rehydrated catalyst. Since the portion of the catalyst of this invention which is actually rehydrated can be controlled by the temperature of the heat treatment step which precedes rehydration, it is possible to carefully balance the desired increase in catalyst activity against the accompanying increase in catalyst cost. For example, if a large increase in aromatics production is desired, as compared to aromatics production with non-rehydrated cubic alumina, the temperature of the heat treatment operation should be relatively low so that most of the catalyst subsequently will undergo a high degree of rehydration. On the other hand, if only a small increase in aromatics production is desired, as compared to aromatics production with non-rehydrated cubic alumina, the temperature of the heat treatment operation should be relatively high and only a small portion of the catalyst subsequently will undergo rehydration. It is seen that the catalyst contemplated by this invention is not a single material but rather a combination of rehydrated and non-rehydrated aluminas, the proportion of each being variable in accordance with the method of preparation. The activity of the catalyst of this invention can be varied by varying the proportion of rehydrated and non-rehydrated material present.

The use of the alumina of this invention as a support for a noble metal reforming catalyst is further described in application Serial Number 246,438, filed on the same date as this application by Jonas Dedinas, William S. Starnes and Meredith M. Stewart.

We claim:

1. A process for the preparation of alumina comprising adding an aqueous solution of an acidic aluminum salt which is substantially free of metals other than aluminum to a substantially metal free aqueous solution of ammonium bicarbonate, maintaining the mixture at a pH between 7 and 9 throughout substantially the entire procedure and substantially preventing any pH in the mixture below 7 or above 9, precipitating alumina hydrate, heat treating said alumina hydrate to a temperature above about 350° F. but below about 1400° F., and contacting said alumina with liquid water to accomplish chemical rehydration thereof.

2. Claim 1 wherein said aluminum salt is aluminum chloride.

3. Claim 1 wherein said aluminum salt is aluminum nitrate.

4. Claim 1 wherein said aluminum salt is a salt of a carboxylic acid.

5. Claim 1 wherein the aqueous solution of acidic aluminum salt is added to the aqueous solution of ammonium bicarbonate intermittently, with stirring, substantially avoiding even temporary, localized zones in the mixture having a pH below 7.

6. Claim 7 wherein the aqueous solution of acidic aluminum salt is added to the aqueous solution of ammonium bicarbonate intermittently, with stirring, substantially avoiding even temporary, localized zones in the mixture having a pH below 7.

7. A process for the preparation of alumina comprising adding an aqueous solution of an acidic aluminum salt which is substantially free of metals other than aluminum to a substantially metal free aqueous solution of ammonium bicarbonate, maintaining the mixture at a pH between 7 and 9 throughout substantially the entire procedure and substantially preventing any pH in the mixture below 7 or above 9, precipitating alumina hydrate a major portion of which has a crystalline configuration as determined by X-ray diffraction and a minor portion of which is amorphous, heat treating said alumina hydrate to a temperature in the range of at least 350° F. and below 1400° F. to convert said crystalline alumina to rehydratable amorphous alumina and non-rehydratable gamma alumina, contacting said heat treated alumina with water to accomplish rehydration of said rehydratable amorphous alumina to pseudoboehmite, and calcining said rehydrated alumina at a temperature between 750° F. and 1500° F. to convert said pseudoboehmite to gamma alumina.

8. A process comprising heat treating an alumina hydrate having about 1.2 to 2.6 moles of water of hydration per mole of alumina and the approximate crystalline configuration as determined by X-ray diffraction of a cube 8.2 A. on edge at a temperature between 350° F. and 1400° F., contacting said heat treated alumina with water to accomplish rehydration thereof, and calcining said rehydrated alumina at a temperature between about 750° F. and 1500° F.

9. The alumina prepared by the method of claim 8.

10. A process comprising heat treating an alumina hydrate having about 1.2 to 2.6 moles of water of hydration per mole of alumina and the approximate crystalline configuration as determined by X-ray diffraction of a cube 8.2 A. on edge at a temperature between 350° F. and 1400° F., and contacting said heat treated alumina with water to accomplish rehydration thereof.

11. The alumina prepared by the method of claim 10.

References Cited by the Examiner

UNITED STATES PATENTS

| | | | |
|---|---|---|---|
| 1,929,942 | 10/1933 | Barclay | 23—143 |
| 1,953,201 | 4/1934 | Tosterud | 23—143 |
| 2,528,751 | 11/1950 | Hunter | 23—143 |
| 2,659,660 | 11/1953 | Sable | 23—143 |
| 2,881,051 | 4/1959 | Pingard | 23—143 |
| 3,024,088 | 3/1962 | Palmquist et al. | 23—143 |

OTHER REFERENCES

Russell: "Alumina Properties," Technical Paper No. 10, Aluminum Co. of America, Pittsburgh, Pa., 1953, 35 pages (pages 22, 26, 27, and 30 of particular interest).

OSCAR R. VERTIZ, *Primary Examiner.*

BENJAMIN HENKIN, *Examiner.*

H. T. CARTER, *Assistant Examiner.*